United States Patent
Jones et al.

(10) Patent No.: US 8,404,181 B2
(45) Date of Patent: Mar. 26, 2013

(54) CORROSION INHIBITION

(75) Inventors: Chris Jones, Cheslyn Hay (GB); Julie Hardy, Aberdeen (GB)

(73) Assignee: Rhodia UK Limited, Watford (GB)

( * ) Notice: Subject to any disclaimer, the term of this patent is extended or adjusted under 35 U.S.C. 154(b) by 1047 days.

(21) Appl. No.: 12/093,319

(22) PCT Filed: Nov. 9, 2006

(86) PCT No.: PCT/EP2006/068291
§ 371 (c)(1),
(2), (4) Date: Dec. 12, 2008

(87) PCT Pub. No.: WO2007/054536
PCT Pub. Date: May 18, 2007

(65) Prior Publication Data
US 2009/0170817 A1    Jul. 2, 2009

(30) Foreign Application Priority Data

Nov. 10, 2005   (GB) .................................. 0522943.0

(51) Int. Cl.
| | |
|---|---|
| C23F 11/167 | (2006.01) |
| C23F 11/16 | (2006.01) |
| C09K 15/32 | (2006.01) |
| C09K 15/12 | (2006.01) |
| C02F 1/50 | (2006.01) |
| C02F 1/68 | (2006.01) |
| C02F 5/14 | (2006.01) |
| A01N 57/18 | (2006.01) |

(52) U.S. Cl. ............. 422/15; 422/7; 422/12; 252/389.2; 252/389.23; 252/400.23; 252/175; 106/14.12; 507/90; 507/128; 507/235; 507/237; 507/238; 514/129; 210/699

(58) Field of Classification Search ............... 252/389.2, 252/389.23, 400.2, 400.23, 175; 422/7, 12, 422/15; 106/14.12; 507/90, 128, 235, 237, 507/238; 514/129; 210/699
See application file for complete search history.

(56) References Cited

U.S. PATENT DOCUMENTS

| | | | |
|---|---|---|---|
| 3,617,574 A * | 11/1971 | Maier | 210/699 |
| 4,052,160 A * | 10/1977 | Cook et al. | 422/15 |
| 4,303,568 A * | 12/1981 | May et al. | 252/389.2 |
| 4,374,733 A * | 2/1983 | Snyder et al. | 210/701 |
| 4,923,634 A * | 5/1990 | Hoots et al. | 252/389.2 |
| 5,055,230 A * | 10/1991 | Clubley et al. | 252/389.62 |
| 5,229,030 A * | 7/1993 | Clubley et al. | 252/389.23 |
| 6,214,777 B1 * | 4/2001 | Li et al. | 508/388 |
| 6,926,836 B2 * | 8/2005 | Fidoe et al. | 210/700 |
| 2003/0226808 A1* | 12/2003 | Fidoe et al. | 210/699 |
| 2009/0170917 A1* | 7/2009 | Lee et al. | 514/381 |

FOREIGN PATENT DOCUMENTS

WO   WO 02/08127 A1   1/2002

* cited by examiner

*Primary Examiner* — Joseph D Anthony
(74) *Attorney, Agent, or Firm* — Hunton & Williams, LLP

(57) ABSTRACT

The present invention relates to a method of preventing or alleviating the problems associated with corrosion and to novel formulations for use in such a method.

14 Claims, 1 Drawing Sheet

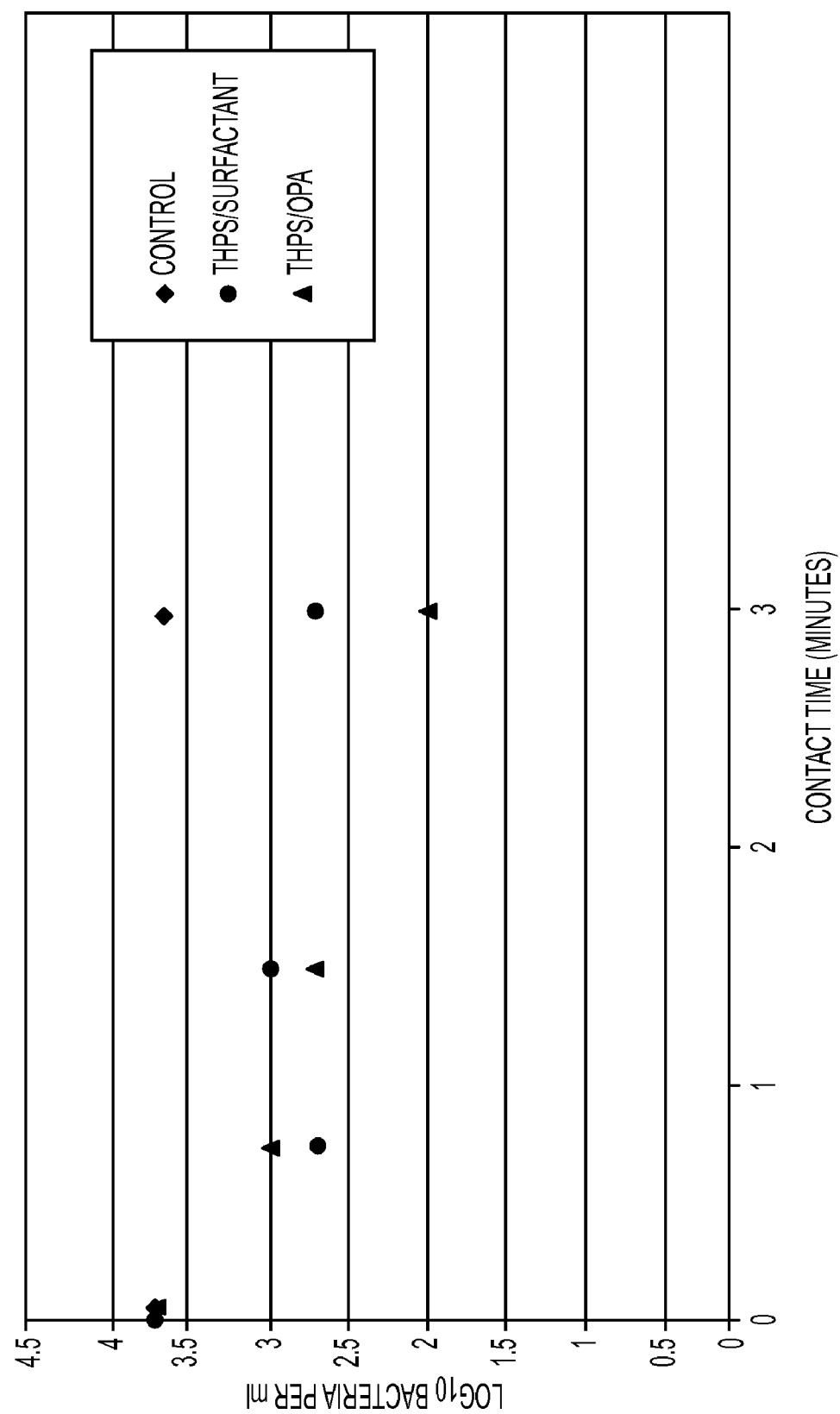

CORROSION INHIBITION

CROSS-REFERENCE TO RELATED APPLICATIONS

This application is the U.S. National Stage filing of International Application No. PCT/EP2006/068291, filed Nov. 9, 2006, which claims the benefit of Patent Application No. GB 0522943.0, filed on Nov. 10, 2005, the disclosures of each of which are hereby incorporated by reference.

The present invention relates to a method of preventing or alleviating the problems associated with corrosion and to novel formulations for use in such a method.

Tetrakis (hydroxyorgano) phosphonium salts (hereinafter $THP^+$ salts), especially tetrakis (hydroxymethyl) phosphonium sulphate (hereinafter THPS), are widely used within aqueous systems, in particular as biocides and metal sulphide dissolvers/dispersers.

However, the $THP^+$ salts may cause problems of corrosion, in particular corrosion of ferrous surfaces, when they are used in aqueous systems at high concentrations.

For example, when THPS is used in oilfields, it is typically applied in concentrations of up to 30%, together with an ammonium salt to improve performance. However, this combination of THPS and an ammonium salt, together with high temperatures that can be experienced in oilfield applications, can be corrosive, for example to mild steel and other metal components.

Certain specialist acid inhibitors have previously been shown to be effective in avoiding these corrosion problems. In WO2005/040050, formulations comprising $THP^+$ salt and a primary, secondary or tertiary alcohol having an acetylenic bond in the carbon backbone have been described for use in avoiding this problem, by permitting the inhibition both of metal sulphide scale and corrosion. WO2004/083131 also describes formulations for use in the treatment of corrosion and metal sulphide scale deposits in aqueous systems, these formulations comprising a $THP^+$ salt and a thio-substituted compound.

However, it has now surprisingly been found that the use of an alkyl phosphonic acid reduces or prevents the corrosive effect of a $THP^+$ salt. Alkyl phosphonic acids are not specialist acid inhibitors and therefore this effect would not have been predicted.

The invention therefore provides, in a first aspect, a formulation for the treatment of aqueous systems comprising a $THP^+$ salt (as hereinbefore defined) and an alkyl phosphonic acid.

Such formulations are beneficial as the $THP^+$ salt acts in a conventional manner, e.g. as a biocide or to dissolve/disperse metal sulphide, whilst the alkyl phosphonic acid controls the corrosive effect of the $THP^+$ salt.

Such formulations are additionally beneficial as the presence of the alkyl phosphonic acid surprisingly increases the efficacy of the $THP^+$ salt as a biocide.

Suitably, the alkyl phosphonic acid is a $C_1$ to $C_{30}$ alkyl phosphonic acid, preferably a $C_2$ to $C_{25}$ alkyl phosphonic acid, more preferably a $C_3$ to $C_{20}$ alkyl phosphonic acid, most preferably a $C_5$ to $C_{15}$ alkyl phosphonic acid, for example a $C_6$ to $C_{12}$ alkyl phosphonic acid, such as a $C_7$, $C_8$, $C_9$ or $C_{10}$ alkyl phosphonic acid.

The alkyl may be unsubstituted or substituted alkyl. When the alkyl is substituted, one or more, for example two or more, such as three or more, of the hydrogen groups of the alkyl moiety are substituted with a functional group. When there is more than one substituted hydrogen, the substituent groups may be the same or different. The substituent functional group may be any suitable group but may, for example, be a halogen group (e.g. fluoro, chloro or bromo).

The alkyl group may be straight chain or branched.

Examples of the alkyl phosphonic acid include octyl phosphonic acid, nonyl phosphonic acid, decyl phosphonic acid, and dodecyl phosphonic acid. In a particularly preferred embodiment of the present invention the alkyl phosphonic acid is octyl phosphonic acid.

The anion of the $THP^+$ salt should be compatible with the aqueous system. The anion should make the $THP^+$ salt water-soluble.

Preferred anions for the $THP^+$ salt include sulphate, chloride, phosphate, bromide, fluoride, carbonate, citrate, lactate, tartrate, borate, silicate, formate and acetate. The sulphate is particularly preferred. The ratio of $THP^+$ to the alkyl phosphonic acid in the formulation is typically in the range of from 1:1 to 750:1, preferably from 10:1 to 500:1, more preferably from 15:1 to 300:1, such as from 20:1 to 100:1, for example from 25:1 to 75:1, most preferably from 30:1 to 60:1, for example from 35:1 to 55:1, such as from 40:1 to 50:1.

The formulation may further include a surfactant. The surfactant is preferably a cationic surfactant, for example quaternary ammonium compounds, N-alkylated heterocyclic compounds or quaternised amido-amines. Alternatively, anionic, amphoteric or non-ionic surfactants may be used. Aminomethane phosphonates may replace ammonium salts in the aqueous system.

The formulation may further include a solvent. The solvent may be aqueous or may be organic.

Examples of solvents include water, dimethyl sulfoxide (DMSO), alkylene glycols, glycol ethers, and tetrahydrofuran (THF). Preferably, the solvent is a glycol solvent, in particular an alkylene glycol.

The alkylene glycol may be a mono alkylene glycol, a di alkylene glycol, a tri alkylene glycol or a poly alkylene glycol. Preferably, the solvent is an alkylene glycol where the alkyl is $C_{2-12}$ alkyl, preferably $C_{2-8}$ alkyl, more preferably $C_{2-5}$ alkyl, such as ethylene, propylene or butylene. For example, the solvent may preferably be ethylene glycol, diethylene glycol, triethylene glycol, polyethylene glycol or propylene glycol. In one embodiment, the solvent is ethylene glycol.

The present invention also provides, in a second aspect, a formulation consisting essentially of the reaction product of a $THP^+$ salt and an alkyl phosphonic acid, wherein the ratio of said $THP^+$ salt to said alkyl phosphonic acid is from 1:1 to 750:1.

The ratio of $THP^+$ to the alkyl phosphonic acid is preferably from 10:1 to 500:1, more preferably from 15:1 to 300:1, such as from 20:1 to 100:1, for example from 25:1 to 75:1, most preferably from 30:1 to 60:1, for example from 35:1 to 55:1, such as from 40:1 to 50:1.

The alkyl phosphonic acid may suitably be as described above in relation to the first aspect.

The $THP^+$ salt may suitably be as described above in relation to the first aspect.

The formulations according to the first and second aspects of the invention are particularly useful in the prevention of corrosion of ferrous materials (e.g. mild steel), copper, and aluminium.

Such formulations may suitably be used to treat metal sulphide scale, for example iron sulphide scale. The iron sulphide may be Troilite (FeS) or Pyrite ($FeS_2$). Alternatively, the iron sulphide may be Mackinawite ($Fe_9S_8$) or Pyrrhotite ($Fe_7S_8$). The metal sulphide to be treated may, alternatively, suitably be lead sulphide or zinc sulphide or a combination thereof.

Such formulations may also be used as biocides, to treat nuisance organisms.

The present invention also provides, in a third aspect, a method for treatment of an aqueous system while concomitantly inhibiting the corrosion of surfaces in contact with said aqueous system, which method comprises the addition, simultaneously, sequentially or separately, of an effective amount of a $THP^+$ salt and an alkyl phosphonic acid.

The treatment may be a treatment to reduce or dissolve metal sulphide scale. Accordingly, the aqueous system may be a system containing, or in contact with, or susceptible to, metal sulphide scale.

The metal sulphide scale may be any metal sulphide scale but suitably may be iron sulphide. The iron sulphide may be Troilite (FeS) or Pyrite ($FeS_2$). Alternatively, the iron sulphide may be Mackinawite ($Fe_9S_8$) or Pyrrhotite ($Fe_7S_8$). The metal sulphide may, alternatively, be lead sulphide or zinc sulphide or a combination thereof.

The treatment may alternatively or additionally be a biocidal treatment. Accordingly, the aqueous system may be a system containing, or in contact with, or susceptible to nuisance micro organisms.

The alkyl phosphonic acid may suitably be as described above in relation to the first aspect.

The $THP^+$ salt may suitably be as described above in relation to the first aspect.

Suitably, sufficient alkyl phosphonic acid is added to reduce or eliminate corrosion of the surfaces in contact with said aqueous system.

Suitably, sufficient $THP^+$ salt is added to achieve the desired treatment of the aqueous system, e.g. enough to reduce or eliminate the nuisance organisms or enough to reduce or eliminate the metal sulphide scale.

In one embodiment, the $THP^+$ salt and alkyl phosphonic acid are added simultaneously. Accordingly, the method may comprise the addition of a formulation in accordance with the first aspect described above.

The aqueous system may be any aqueous system wherein the application of $THP^+$ salt may cause corrosion. Preferably, the aqueous system is an enhanced oil recovery aqueous system. Alternatively, the aqueous system may be an industrial water aqueous system or a paper manufacturing aqueous system.

The $THP^+$ salt is preferably added in an effective amount of up to 30% by weight, preferably from 5% to 30%, for example from 10% to 25% by weight, such as from 15% to 20% by weight.

The alkyl phosphonic acid is preferably added in an effective amount of from 0.1 to 100,000 ppm, relative to the volume of the system being treated, more preferably from 1 to 10,000 ppm, such as from 10 to 10,000 ppm, for example from 100 to 1,000 ppm.

The surfaces in contact with said aqueous system may suitably comprise any metallic material but may in particular comprise ferrous materials (e.g. mild steel), copper, and/or aluminium.

The present invention also provides, in a fourth aspect, the use of an alkyl phosphonic acid to reduce or prevent the corrosive effect of a $THP^+$ salt.

The alkyl phosphonic acid is suitably as described above in relation to the first aspect.

The $THP^+$ salt may suitably be as described above in relation to the first aspect.

The alkyl phosphonic acid may be used in combination with the $THP^+$ salt by the use of a formulation in accordance with the first or second aspect of the invention.

The alkyl phosphonic acid may suitably be used in combination with a $THP^+$ salt in the form of a solution. In this case the solvent may suitably be as described above in relation to the first aspect.

The use may involve the simultaneous, sequential or separate addition of an alkyl phosphonic acid and a $THP^+$ salt to a system to be treated.

The use may suitably be in relation to the treatment of aqueous systems.

Preferably, the use may be in the treatment of an aqueous system containing or in contact with metal sulphide scale.

Additionally or alternatively, the use may be in the treatment of an aqueous system containing or in contact with nuisance micro organisms.

The use may suitably involve the inhibition of corrosion of surfaces in contact with the aqueous system. The surfaces in contact with said aqueous system may suitably comprise any metallic material but may in particular comprise ferrous materials (e.g. mild steel), copper, and/or aluminium.

The present invention also provides, in a fifth aspect, the use of a formulation in accordance with the first or second aspect of the invention, for the reduction, elimination or prevention of metal sulphide scale and the reduction, elimination or prevention of corrosion.

The alkyl phosphonic acid may suitably be as described above in relation to the first aspect.

The $THP^+$ salt may suitably be as described above in relation to the first aspect.

The use may suitably be in relation to the treatment of aqueous systems.

Preferably, the use may be in the treatment of an aqueous system containing or in contact with metal sulphide scale.

The use may suitably involve the inhibition of corrosion of surfaces in contact with the aqueous system. The surfaces in contact with said aqueous system may suitably comprise any metallic material but may in particular comprise ferrous materials (e.g. mild steel), copper, and/or aluminium.

In particular, the use may be in the treatment of an aqueous system containing or in contact with metal sulphide scale while concomitantly inhibiting the corrosion of surfaces in contact with said aqueous system.

The aqueous system may be any aqueous system wherein the application of $THP^+$ salt may cause corrosion. Preferably, the aqueous system is an enhanced oil recovery aqueous system. Alternatively, the aqueous system may be an industrial water aqueous system or a paper manufacturing aqueous system.

The metal sulphide scale may be any metal sulphide scale but suitably may be iron sulphide. The iron sulphide may be Troilite (FeS) or Pyrite ($FeS_2$). Alternatively, the iron sulphide may be Mackinawite ($Fe_9S_8$) or Pyrrhotite ($Fe_7S_8$). The metal sulphide may, alternatively, be lead sulphide or zinc sulphide or a combination thereof.

The present invention also provides, in a sixth aspect, the use of a formulation in accordance with the first or second aspect of the invention, for the reduction, elimination or prevention of nuisance micro organisms and the reduction, elimination or prevention of corrosion.

The alkyl phosphonic acid may suitably be as described above in relation to the first aspect.

The $THP^+$ salt may suitably be as described above in relation to the first aspect.

The use may suitably be in relation to the treatment of aqueous systems.

Preferably, the use may be in the treatment of an aqueous system containing or in contact with nuisance micro organisms.

The use may suitably involve the inhibition of corrosion of surfaces in contact with the aqueous system. The surfaces in contact with said aqueous system may suitably comprise any metallic material but may in particular comprise ferrous materials (e.g. mild steel), copper, and/or aluminium.

In particular, the use may be in the treatment of an aqueous system containing or in contact with nuisance micro organisms while concomitantly inhibiting the corrosion of surfaces in contact with said aqueous system.

The aqueous system may be any aqueous system wherein the application of $THP^+$ salt may cause corrosion. The aqueous system may be an enhanced oil recovery aqueous system. Alternatively, the aqueous system may be an industrial water aqueous system or a paper manufacturing aqueous system.

The present invention provides, in a seventh aspect, the use of an alkyl phosphonic acid in combination with a $THP^+$ salt in order to enhance the biocidal efficacy of the $THP^+$ salt.

The alkyl phosphonic acid may suitably be as described above in relation to the first aspect.

The $THP^+$ salt may suitably be as described above in relation to the first aspect.

The alkyl phosphonic acid may be used in combination with the $THP^+$ salt by the use of a formulation in accordance with the first or second aspect of the invention.

The use is suitably in relation to the treatment of an aqueous system containing, or in contact with, nuisance micro organisms. The micro organisms may, in particular, be general heterotrophic bacteria.

The use may involve the simultaneous, sequential or separate addition of an alkyl phosphonic acid and a $THP^+$ salt to a system to be biocidally treated.

The alkyl phosphonic acid may suitably be used in combination with a $THP^+$ salt in the form of a solution. In this case the solvent may suitably be as described above in relation to the first aspect.

The alkyl phosphonic acid may suitably be used in combination with a $THP^+$ salt to contact a system containing, or in contact with, nuisance micro organisms. The acid and $THP^+$ salt may be contacted with the system for any suitable period of time, for example 10 seconds or more, such as 30 seconds or more, preferably 45 seconds or more, more preferably one minute or more, for example from one minute to four minutes or more, preferably one and a half minutes or more, for example from two minutes to three minutes or more.

The present invention will be illustrated, merely by way of example, as follows.

EXAMPLE 1

Aqueous solutions of THPS were tested on mild steel coupons at 50° C. for 24 hours to assess the corrosion control effect of various agents, which included compounds known generally as inhibitors and an alkyl phosphonic acid. Each solution comprised a 50 wt % active THPS solution plus 1 wt % of "potential corrosion control agent". The corrosion effect on the mild steel coupons was measured.

The corrosion rate in mils per year was then calculated for each agent.

| Potential Corrosion Control Agent | Corrosion Rate (mils per year) |
| --- | --- |
| None | 45 |
| Imidazoline based inhibitor | 110 |
| Phosphonocarboxylate based inhibitor | 130 |
| Fatty amine derivative based inhibitor | 80 |
| Phosphate ester based inhibitor | 200 |
| Polyaspartate based inhibitor | 55 |
| Octyl phosphonic acid (OPA) | 8 |

EXAMPLE 2

A THPS+octyl phosphonic acid (OPA) solution in ethylene glycol was tested on mild steel coupons at 50° C. for 24 hours to assess the corrosion control effect. The corrosion effect on the mild steel coupons was measured.

The corrosion rate in mils per year was then calculated.

| Formulation | Corrosion Rate (mils per year) |
| --- | --- |
| 50 wt % THPS plus 1 wt % OPA in ethylene glycol solvent | 0.8 |

As can be seen from these Examples, the use of an alkyl phosphonic acid is very effective in controlling the corrosion effect of $THP^+$ salt. This is surprising as the common inhibitors were shown to be ineffective in this regard.

EXAMPLE 3

An established biofilm was grown for 29 days. This biofilm was removed from its growth surface and challenged with test solutions.

Firstly, a THPS+octyl phosphonic acid (OPA) aqueous solution (250 ml/l of active ingredient) was contacted with the biofilm for between 0 and 3 minutes to assess the biocidal effect. The number of surviving bacteria per ml (general heterotrophic bacteria) in the biofilm was then measured.

The experiment was repeated for a control, using no active ingredients in the contact aqueous solution.

The experiment was also repeated for a comparative test, using THPS+surfactant aqueous solution (250 ml/l of active ingredient).

The results, indicating the number of surviving bacteria in the biofilm for each of the solutions tested, are shown in FIG. 1.

As can be seen from this Example, the use of an alkyl phosphonic acid is surprisingly effective in increasing the biocidal effect of $THP^+$ salt, with a solution of $THP^+$ salt plus alkyl phosphonic acid allowing a greater reduction in bacteria to be achieved than a solution of $THP^+$ salt plus surfactant.

The invention claimed is:

1. A method for inhibiting the corrosion of a surface in contact with an aqueous system, comprising:
    adding simultaneously, sequentially, or separately to the aqueous system, an effective amount of a $THP^+$ salt and an alkyl phosphonic acid,
    wherein said alkyl phosphonic acid comprises an unsubstituted $C_1$-$C_{30}$ alkyl.
2. The method of claim 1, wherein the inhibiting comprises reducing or dissolving metal sulfide scale.
3. The method of claim 1, wherein the inhibiting comprises a biocidal treatment.
4. The method of claim 1, wherein the $THP^+$ salt and alkyl phosphonic acid are added simultaneously.

5. The method of claim 1, wherein the aqueous system comprises an enhanced oil recovery aqueous system, an industrial water aqueous system, or a paper manufacturing aqueous system.

6. The method of claim 1, wherein the THP$^+$salt is added in an effective amount of 30% or less by weight.

7. The method of claim 1, wherein the alkyl phosphonic acid is added in an effective amount ranging from 0.1 to 100,000 ppm, relative to the volume of the aqueous system.

8. The method of claim 1, wherein the surface in contact with said aqueous system comprises a ferrous material, copper, and/or aluminum.

9. A method of reducing and/or preventing the corrosive effect of a THP$^+$salt in a system comprising:
   treating a composition comprising said THP$^+$salt with an alkyl phosphonic acid
      wherein said alkyl phosphonic acid comprises an unsubstituted $C_1$-$C_{30}$ alkyl.

10. The method of claim 9, wherein said system comprises an aqueous systems.

11. The method of claim 10, wherein said corrosive effect comprises corrosion of surfaces comprising ferrous materials, copper, and/or aluminum that are in contact with the aqueous system.

12. A method for the reduction, elimination, or prevention of metal sulfide scale and the reduction, elimination, or prevention of corrosion comprising:
   adding a formulation comprising a THP$^+$salt and an alkyl phosphonic acid to an aqueous system in contact with a surface subject to the scale or corrosion
      wherein said alkyl phosphonic acid comprises an unsubstituted $C_1$-$C_{30}$ alkyl.

13. A method for the reduction, elimination, or prevention of nuisance microorganisms and the reduction, elimination, or prevention of corrosion comprising:
   adding a formulation comprising a THP$^+$salt and an alkyl phosphonic acid to an aqueous system in contact with a surface subject to the nuisance microorganisms or corrosion
      wherein said alkyl phosphonic acid comprises an unsubstituted $C_1$-$C_{30}$ alkyl.

14. A method for enhancing the biocidal efficacy of a THP$^+$salt comprising:
   combining an alkyl phosphonic acid with said THP$^+$salt to form a mixture, and
   treating a surface subject to nuisance microorganisms with said mixture
      wherein said alkyl phosphonic acid comprises an unsubstituted $C_1$-$C_{30}$ alkyl.

* * * * *